United States Patent [19]

Houk et al.

[11] Patent Number: 4,940,302

[45] Date of Patent: Jul. 10, 1990

[54] INTEGRATED OPTICS WAVEGUIDES WITH LARGE PHASE SHIFTS

[75] Inventors: Theodore L. Houk; R. Aaron Falk, both of Seattle, Wash.

[73] Assignee: The Boeing Company, Seattle, Wash.

[21] Appl. No.: 322,532

[22] Filed: Mar. 13, 1989

[51] Int. Cl.⁵ .............................................. G02B 6/12
[52] U.S. Cl. ............................... 350/96.12; 350/96.15
[58] Field of Search ............... 350/96.11, 96.12, 96.13, 350/96.14, 96.15

[56] References Cited

U.S. PATENT DOCUMENTS

| | | | |
|---|---|---|---|
| 4,547,262 | 10/1985 | Spillman, Jr. et al. | 156/659.1 |
| 4,583,817 | 4/1986 | Papuchon | 350/96.14 |
| 4,679,893 | 7/1987 | Ramer | 350/96.14 |
| 4,695,121 | 9/1987 | Mahapatra et al. | 350/96.12 |
| 4,705,346 | 11/1987 | Miyawaki | 350/96.14 |
| 4,707,059 | 11/1987 | Ogura et al. | 350/96.13 |
| 4,709,978 | 12/1987 | Jackel | 350/96.14 |
| 4,725,774 | 2/1988 | Davis et al. | 350/96.11 X |
| 4,755,014 | 7/1988 | Stoll et al. | 350/96.12 |
| 4,758,060 | 7/1988 | Jaeger et al. | 350/96.11 |
| 4,768,848 | 9/1988 | Vaerewyck | 350/96.12 |
| 4,778,236 | 10/1988 | Miyawaki | 350/96.14 |
| 4,799,750 | 1/1989 | Miyawaki | 350/96.13 |

FOREIGN PATENT DOCUMENTS 0249772 9/1987 German Democratic Rep. .................. 350/96.12

OTHER PUBLICATIONS

Jackel, Glass, Peterson, Rice, Olson and Veselka, "Damage-Resistant LiNbO₃ Waveguides", *J. Appl. Phys.* 55, (1) 269-270, (Jan. 1984).

Nutt, A., "Experimental Observations of Light Propagation in Proton-Exchanged Lithium Niobate Waveguides", *J. Opt. Communication* 6, (1), pp. 8-9, (1985).

Haruna, Nakajima, Nishihara, "Optical Pi-Waveguide Interferometer in Proton-Exchanged LiNbO₃ for Temperature Sensing", *Applied Optics* 24, p. 2483, (Aug. 1985).

Hinkov and Ise, "Control of Birefringence in Ti:LiNbO₃ Optical Waveguides by Proton Exchange of Lithium Ions", *J. Lightwave Technol.* LT-4, p. 444, (Apr. 1986).

Canali et al., "Structural Characterization of Proton Exchanged LiNbO₃ Optical Waveguides", *J. Appl. Phys.* 59, p. 2643, (Apr. 1986).

Dawar et al., "Fabrication and Characterization of Titanium-Indiffused Proton-Exchanged Optical Waveguides in γ-LiNbO₃", *Appl. Optics* 25, p. 1495, (May 1986).

Zang, D. and Tsai, C., "Titanium-Indiffused Proton-Exchanged Waveguide Lenses in LiNbO₃ for Optical Information Processing", *Appl. Optics* 25, (Jul. 1986).

Nutt et al., "Control of Ti-Diffused LiNbO₃ Waveguide Profile and Propagation Characteristics by the Proton Exchange of Lithium Ions", *OFC/IOOC* 1987 *Paper.*

Li et al., "High-Index Low-Loss LiNbO₃ Waveguides", *OFC/IOOC* 1987 *Paper.*

Carlson, B., "A Foundry Approach to Integrated Optics", *Photonics Spectra*, (Mar. 1987).

(List continued on next page.)

*Primary Examiner*—John D. Lee
*Attorney, Agent, or Firm*—Christensen, O'Connor, Johnson & Kindness

[57] ABSTRACT

A technique for producing an integrated optics waveguide having a large index of refraction difference with respect to an otherwise similar waveguide that does not utilize the invention. A proton exchange region is formed in a lithium niobate substrate, and a titanium waveguide is formed in the substrate within the proton exchange region. The dimensions of the waveguide and proton exchange region are selected such that substantially all of the field of the lowest guided mode of the waveguide is contained within the proton exchange region. By utilizing such a waveguide as one arm of an interferometer formed in the substrate, a large optical path length difference between the interferometer arms may be created.

11 Claims, 3 Drawing Sheets

OTHER PUBLICATIONS

Midwinter, J., *Optical Fibers for Transmission*, Sections 4.4 et seq., John Wiley & Sons publishers in UK, (1979).

Jackel and Johnson, "Voltage-Tunable Wavelength Filtering with a Nonsymmetric Interferometer", p. 256, Bell Communications Research, Red Bank, N.J.

Jackel, Rice and Veselka, "Proton Exchange for High-Index Waveguides in $LiNbO_3$", *Appl. Phys. Letter* 41, p. 607 (Oct. 1982).

Goodwin and Stewart, "Proton-Exchanged Optical Waveguides in $\gamma$-Cut Lithium Niobate", *Electronics Letters*, vol. 19, No. 6, p. 223, (Mar. 1983).

Micheli et al., "Fabrication and Characterization of Titanium Indiffused Proton Exchanged (TIPE) Waveguides in Lithium Nibate", *Optics Comm.* (Jun. 1982).

Bulmer and Burns, "Pyroelectric Effect in $LiNbO_3$ Channel-Waveguide Devices", *Appl. Phys. Letter* (48), p. 1036 et seq. (Apr. 1986).

Gee, Thurmond, and Yen, "17-GHz Bandwidth Electro-Optic Modulator", *Appl. Phys. Letter* (43), p. 998 et seq. (Dec. 1983).

Haga, Izutsu and Sueta, "$LiNbO_3$ Traveling-Wave Light Modulator/Switch with an Etched Groove", *IEEE J. of Quantum Elec.*, QE-22, No. 6, (Jun. 1986).

Becker R., "Traveling-Wave Electro-Optic Modulator with Maximum Bandwidth-Length Product", *Appl. Phys. Letter* 45, p. 1168 et seq. (Dec. 1984).

Burns, W., "Interferometric Waveguide Modulator with Polarization-Independent Operation", *Appl. Phys. Letter* 33, p. 944 et seq. (Dec. 1978).

DeMicheli et al., "Independent Control ... In Proton-Exchanged ... Guides", *Optics Letters*, vol. 8, No. 2, Feb. 1983, pp. 114–115.

Papuchon et al., "Integrated Optical Polariser ... Using Proton Exchange", *Electron. Lett.*, vol. 19, No. 16, Aug. 1983, pp. 612–613.

Suchoski et al., "Low-Loss High-Extinction Polarizers ... By Proton Exchange", *Optics Letters*, vol. 13, No. 2, Feb. 1988, pp. 172–174.

Findakly et al., "High-Quality $LiTaO_3$ Integrated-Optical Waveguides ... ", *Optics Letters*, vol. 13, No. 9, Sep. 1988, pp. 797–799.

INTEGRATED OPTICS WAVEGUIDES WITH LARGE PHASE SHIFTS

FIELD OF THE INVENTION

The present invention relates to optical waveguides formed using integrated optics technology.

BACKGROUND OF THE INVENTION

A conventional way of forming an integrated optics waveguide is to diffuse titanium into the surface of a lithium niobate crystal, such that the titanium indiffused region forms a linear channel in the crystal parallel to the crystal surface. To create a single mode optical waveguide, typical titanium channel widths are 2–4 microns. The titanium increases the index of refraction of the lithium niobate by about 0.01 (from 2.10 to 2.11), and this index of refraction shift is sufficient to confine an optical signal to the waveguide. The waveguide is typically fabricated by depositing a strip of titanium on the lithium niobate crystal using photolithography techniques, and then diffusing the titanium into the crystal at a temperature of about 1,000° C.

There are a number of applications in which it would be desirable to produce large and controllable variations in the effective index of refraction of an integrated optics waveguide. One class of such applications involves the use of interferometers having unequal arm lengths. By way of example, FIG. 1 schematically illustrates a Mach-Zehnder interferometer of a type commonly used in integrated optics applications. The interferometer includes input waveguide 12, arms (i.e., waveguides) 14 and 16, and output waveguide 18. Arms 14 and 16 are coupled to the input and output waveguides by Y-couplers 20 and 22 respectively. Y-coupler 20 divides an optical input signal on input waveguides 12 between arms 14 and 16, and Y-coupler 22 combines the optical signals on arms 14 and 16 onto output waveguide 18.

If the optical path lengths of arms 14 and 16 differ from one another, then the optical signals from the arms will be phase shifted (or equivalently, time delayed) with respect to one another when they are brought together at Y-coupler 22. For the case in which the arms have different physical path lengths, the amount of the phase shift will be equal to $2\pi n \Delta d/\lambda$, where n is the effective index of refraction of the waveguides, $\Delta d$ is the path length difference, and $\lambda$ is the wavelength of the light. An example of an application of unequal arm length interferometers is coherence multiplexing. In a coherence multiplexing system, each information bearing channel is associated with an interferometer having a particular optical path length difference, and the optical path length differences must differ from one another by an amount greater than the coherence length of the light. Thus the ability to create a wide range of optical path length differences increases the number of channels that may be multiplexed.

FIG. 2 illustrates one geometric means of obtaining a physical path length differences in a Mach-Zehnder interferometer. The illustrated interferometer includes input waveguide 30, arms 32 and 34, and output waveguide 36. To avoid radiating energy out of the waveguide, the angle 38 between arms 32 and 34 is limited to about 1.2°. With this limitation, for an interferometer having a length L of 20 mm, the maximum resulting physical path length difference is 6.7 microns. FIG. 3 illustrates an interferometer in which arm 40 has the shape of a curve that takes the longest possible route between two points a distance L apart. For this arrangement, to avoid unacceptable radiation loss, the angle 44 between arms 40 and 42 is limited to 1.2°, and arm 40 has a minimum radius of curvature of 110 mm. The result is that for a length L of 20 mm, the maximum physical path length differences is 25.2 microns.

An optical path length difference between two interferometer arms can be produced not only by fabricating the arms to have different physical lengths, but also by causing the arms to have different effective indices of refraction. The usual method of varying the index of refraction of a waveguide is to fabricate the waveguide in an electro-optic material such as lithium niobate, deposit electrodes adjacent a portion of the waveguide, and then apply a voltage to the electrodes. The electric field produced by the applied voltage rotates the index of refraction ellipsoid slightly, thereby changing the effective index of refraction along the direction that light passes through the waveguide. This in turn changes the waveguide optical path length by $\Delta n d$, $\Delta n$ being the index of refraction change, and d being the length of the waveguide section over which the field is applied.

The phase shift that can be produced via the electro-optic approach is $2\pi \Delta n d/\lambda$, and this expression may be evaluated from known crystal properties or from the properties of available commercial integrated optics devices. For example, a Mach-Zehnder interferometer sold by Crystal Technology produces a phase shift of $2\pi$ for light having a wavelength of 850 nanometers, from electrodes 4 mm long. Over a 20 mm length, the optical path difference is 4.3 microns at a maximum. Using the practical 1 MV/m maximum electric field in the theoretical 164 pm/V electro-optic coefficient, such as interferometer of 14 mm electrode length in 20 mm overall length would produce only 5.3 microns of optical path difference by application of an electric field.

SUMMARY OF THE INVENTION

The present invention provides a technique for producing an optical waveguide having a large index of refraction difference with respect to an otherwise similar waveguide that does not utilize the present invention. The invention thereby permits construction of an interferometer having arms that have a very large path length difference between them.

In accordance with the present invention, a proton exchange region is formed in an electro-optic lithium-containing substrate such as lithium niobate. A waveguide is also formed in the substrate, within the proton exchange region. The waveguide has associated with it a lowest guided mode that defines a spatial distribution of a field of an optical signal traveling along the waveguide. The dimensions of the waveguide and the proton exchange region are selected such that substantially all of the field of the lowest guided mode is contained within the proton exchange region. As a result, the effective index of refraction of the waveguide is substantially equal to the index of refraction of the proton exchange region. Because large index of refraction shifts are possible using proton exchange, the result is that a waveguide so formed will have an effective index of refraction that differs substantially from a conventional waveguide formed in the same substrate. By applying this technique to one arm of an interferometer formed in the substrate, a large optical path length difference between the interferometer arms may be created.

DETAILED DESCRIPTION OF THE INVENTION

Figure 4:
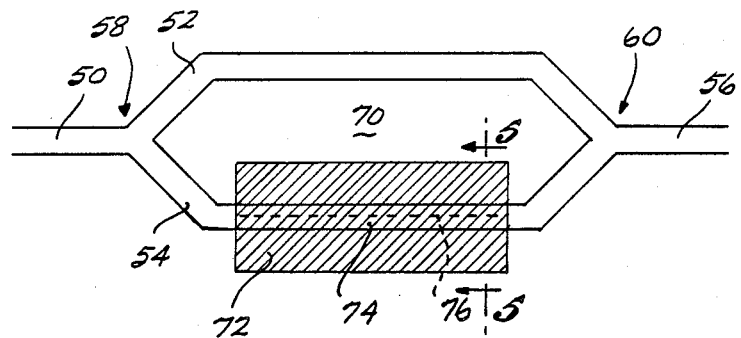
FIG. 4 is a schematic diagram showing an interferometer formed in accordance with the present invention.
Figure 5:
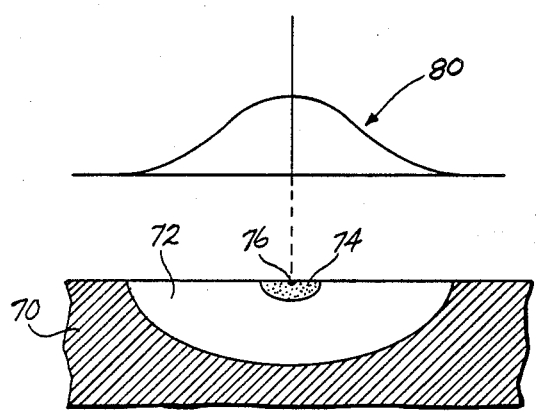
FIG. 5 is a cross section taken along line 5—5 in FIG. 4, and a related graph showing the field distribution.

FIGS. 4 and 5 schematically illustrate a waveguide and a Mach-Zehnder interferometer formed in accordance with the present invention. The illustrated interferometer includes input waveguide 50, arm waveguides 52 and 54, and output waveguide 56. Arm waveguides 52 and 54 are coupled to the input and output waveguides by Y-couplers 58 and 60, respectively. All waveguides are formed by the diffusion of a metal into substrate 70. The metal is preferably titanium, although other single valence metals such as rubidium, tantalum, and cesium may be used for certain applications. Substrate 70 is preferably lithium niobate, although other electro-optic lithium compounds such as lithium tantalate may also be used.

A proton exchange region 72 is also formed in substrate 70, such that the proton exchange region contains within it a portion 74 of arm waveguide 54. FIG. 5 shows the cross section of the resulting structure. Waveguide 74 has a central longitudinal lengthwise axis 76, and proton exchange region 72 is symmetrically positioned with respect to the lengthwise axis in the transverse direction, i.e., in the direction parallel to the surface of substrate 70 and normal to lengthwise axis 76. In addition, the depth of proton exchange region 72 substantially exceeds the depth of waveguide 74. The result is that waveguide 74 is centrally positioned in and surrounded by the substantially larger proton exchange region 72.

Proton exchange is a known process for varying the optical characteristics of a lithium containing crystal such as lithium niobate. The process involves exchanging the lithium atoms of the crystal for hydrogen atoms. One suitable technique for accomplishing proton exchange is to immerse the crystal into a melt consisting of benzoic acid and a lithium salt, at a temperature on the order of 200° C. A preferred technique for creating a proton exchange region, for the purpose of the present invention, involves using pyrophosphoric acid as the proton source, in conjunction with the two-proton exchange process described in Li et al., "High-Index Low-Loss LiNbO$_3$ Waveguides", *OFC/IOOC*, 1987 Paper TUH4. Whatever technique is used, the proton exchange should generally be carried out after the waveguides are formed, due to the relatively higher temperature required for waveguide formation.

The effect of proton exchange is to create a region of the crystal that has an index of refraction that differs substantially from the index of refraction of the untreated crystal. For example, the index of refraction of lithium niobate is 2.10, while a typical index of refraction of a proton exchange region in lithium niobate is 2.22, a difference of 0.12. By way of contrast, the index of refraction of a titanium waveguide formed in lithium niobate is 2.11, a difference of only 0.01 from the substrate itself.

Although the present invention is applicable to both single and multi-mode waveguides, the need to produce a large and controlled optical path length shift arises most frequently in connection with single mode waveguides, for example in coherence multiplexed systems and optical computing systems. The examples described below will therefore be directed to single mode waveguides, to simplify the discussion.

Figure 1:
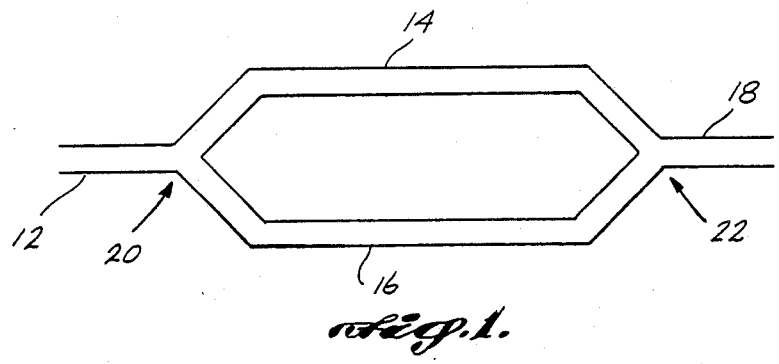
FIG. 1 is a schematic diagram of an integrated optics implementation of a Mach-Zehnder interferometer.
Figure 2:
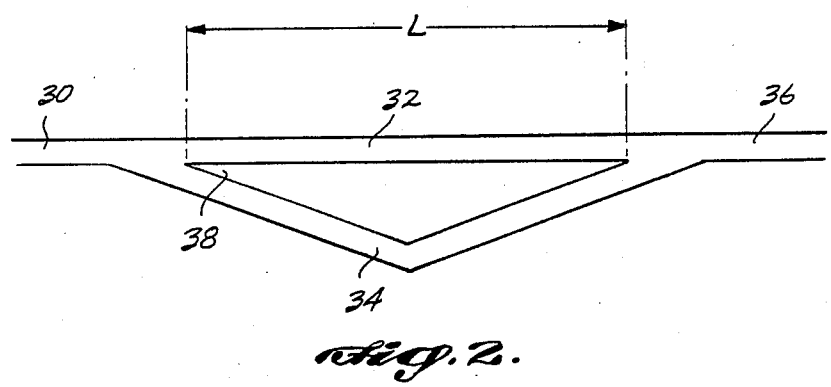
FIG. 2 is a sketch showing one way to create a physical path length difference between interferometer arms.
Figure 3:
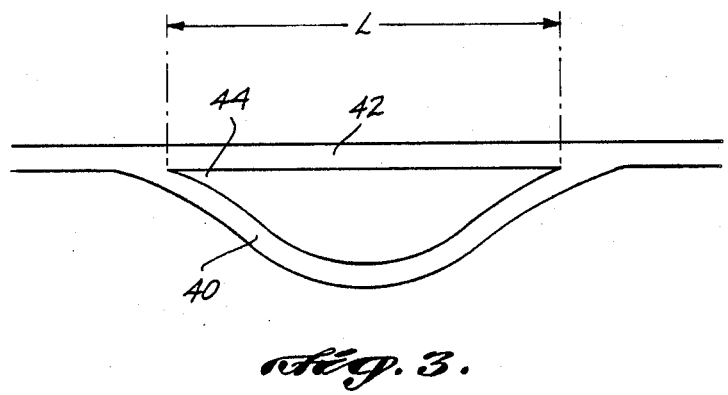
FIG. 3 is a schematic diagram showing a second way to create a physical path length difference between interferometer arms.

Single-mode titanium waveguides in lithium niobate may be produced by restricting the waveguide width to the order of 3-6 microns. In FIG. 5, it is assumed that the width of waveguide 74 is so limited, and graph 80 o illustrates the field associated with the single guided mode supported by such a waveguide. For the case in which waveguide 74 is multi-mode, graph 80 would represent the field of the lowest order guided mode supported by the waveguide. It will be noted that the field extends substantially outside the waveguide into proton exchange region 72, but does not extend to a significant degree outside the proton exchange region. A preferred width for proton exchange region 72, for a single mode titanium waveguide, is in the range of 20–30 microns. Because the entire field is contained within the proton exchange region, the effective index of refraction of waveguide 74 is substantially equal to the index of refraction of proton exchanged lithium niobate, i.e., 2.22. This large index of refraction, in comparison to that of waveguide 52 (FIG. 4) that does not pass through a proton exchange region, permits very large phase differences to be created between the two interferometer arms. For example, for a Mach-Zehnder interferometer of 20 mm total length, and with a 14 mm section of one waveguide incorporated into a proton exchange region, the index of refraction change of 0.12 will produce an optical path length difference equal to $\Delta n \cdot d$, or 1680 microns. This represents an increase of over two orders of magnitude with respect to the path length differences that can be created using geometric techniques such as those shown in FIGS. 2-3, or by application of an electric field to one interferometer arm.

The proton exchange region need not be precisely aligned with the titanium waveguide, and a tolerance of up to 3 microns is acceptable, as with proton exchange waveguides coupled to titanium waveguides. It is only necessary to make the proton exchange region extend far enough from the waveguide, in both the width and depth dimensions, so that the field of the lowest order guided mode of the waveguide is substantially contained within the proton exchange region. For the single mode guides discussed above, the proton exchange region preferably extends 8-12 microns from the titanium waveguide.

Figure 6:
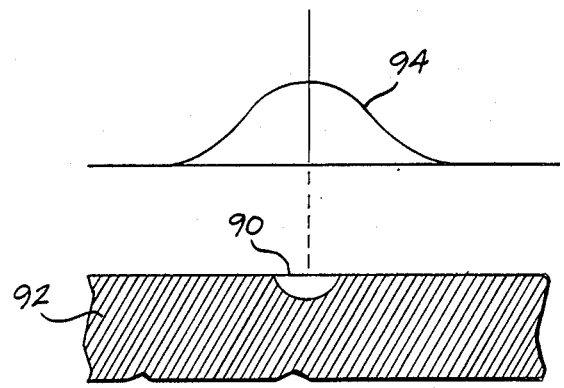
FIG. 6 is a cross section and a field distribution graph for a single mode titanium waveguide.
Figure 7:
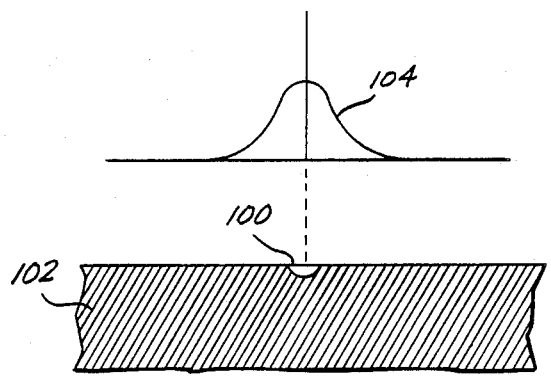
FIG. 7 is a cross section and a field distribution graph for a single mode proton exchange waveguide.

FIGS. 6 and 7 contrast the present invention with waveguides formed from titanium alone or from a proton exchange region alone. FIG. 6 illustrates titanium waveguide 90 formed in lithium niobate substrate 92, and graph 94 shows the resulting field distribution for the lowest order bound mode. To produce a single mode guide, the width of the titanium region is 3-6 microns. The field extends for a substantial distance (e.g., 3-8 microns) outside of each side of waveguide 90. Thus the effective index of refraction of the waveguide is only slightly higher than the index of refraction of lithium niobate itself.

FIG. 7 illustrates a single mode waveguide 100 formed by proton exchange in lithium niobate substrate 102. Graph 104 illustrates the resulting field distribution. To produce a single mode guide, the width of waveguide 100 is on the order of 2 microns. The field distribution 104 is narrower than field distribution 94 shown in FIG. 6, both because waveguide 100 is narrower, and because of the higher index of refraction shift caused by proton exchange, as compared to titanium. Nevertheless, a substantial portion of the field extends (e.g., for 3-8 microns) into substrate 102 outside of waveguide 100. Thus the effective index of refraction of the waveguide is substantially less than the index of refraction of proton exchange lithium niobate, because the major portion of the field of outside the proton exchange region. Those skilled in the art will appreciate that this problem could not be overcome simply by widening waveguide 100, because the resulting waveguide would then support a large number of modes, producing serious time dispersion problems, and because of the resulting recollection inefficiency at the juncture between such a waveguide and other integrated optics components.

While the preferred embodiments of the invention have been illustrated and described, variations will be apparent to those skilled in the art. Accordingly, the invention is to be determined by reference to the following claims.

The embodiments of the invention in which an exclusive property or privilege is claimed are defined as follows:

1. An integrated optic device, comprising:
   an electro-optic substrate comprising lithium;
   a proton exchange region formed in the substrate;
   a waveguide formed in the substrate within the proton exchange region, the waveguide having a lengthwise axis and having associated with it a lowest guided mode that defines a spatial distribution of a field of an optical signal traveling along the waveguide, the dimensions of the waveguide and the proton exchange region being selected such that substantially all of the field of the lowest guided mode is contained within the proton exchange region; and
   means for introducing the optical signal into an end of the waveguide such that the optical signal propagates along the lengthwise axis.

2. The device of claim 1, wherein the waveguide comprises titanium and the substrate comprises lithium niobate.

3. The device of claim 2, wherein the waveguide is contained entirely within the proton exchange region.

4. The device of claim 3, wherein the substrate has a planar surface in which the proton exchange region and waveguide are formed, and wherein the waveguide is centrally positioned with respect to the proton exchange region in a direction parallel to said surface and normal to said lengthwise axis.

5. The device of claim 3, wherein the waveguide is a single mode waveguide, and wherein the proton exchange region extends laterally from either side of the waveguide for a distance of at least eight microns.

6. An interferometer formed in an electro-optic substrate comprising lithium, the interferometer comprising first and second arms along which an optical signal can pass, the first arm comprising a proton exchange region formed in the substrate, and a waveguide formed within the proton exchange region, the waveguide having associated with it a lowest guided mode that defines a spatial distribution of a field of an optical signal traveling along the waveguide, the dimensions of the waveguide and the proton exchange region being selected such that substantially all of the field of the lowest guided mode is contained within the proton exchange region.

7. The interferometer of claim 6, wherein the waveguide comprises titanium and the substrate comprises lithium niobate.

8. The interferometer of claim 7, wherein the waveguide is contained entirely within the proton exchange region.

9. The interferometer of claim 8, wherein the substrate has a planar surface in which the proton exchange region and waveguide are formed, wherein the waveguide has a lengthwise axis along which the optical signal passes, and wherein the waveguide is centrally positioned with respect to the proton exchange region in a direction parallel to said surface and normal to said lengthwise axis.

10. The interferometer of claim 8, wherein the second arm comprises a waveguide that does not pass through the proton exchange region.

11. The interferometer of claim 8, wherein the waveguide is a single mode waveguide, and wherein the proton exchange region extends laterally from either side of the waveguide for a distance of at least eight microns.

* * * * *